United States Patent
Wesigner et al.

(10) Patent No.: US 7,249,378 B2
(45) Date of Patent: *Jul. 24, 2007

(54) FIREWALL PROVIDING ENHANCED NETWORK SECURITY AND USER TRANSPARENCY

(75) Inventors: Ralph E. Wesigner, Naples, FL (US); Christopher D. Coley, Morgan Hill, CA (US)

(73) Assignee: GraphOn Nes Sub, LLC, Santa Cruz, CA (US)

( * ) Notice: Subject to any disclaimer, the term of this patent is extended or adjusted under 35 U.S.C. 154(b) by 346 days.

This patent is subject to a terminal disclaimer.

(21) Appl. No.: 10/700,411

(22) Filed: Nov. 3, 2003

(65) Prior Publication Data

US 2004/0098624 A1    May 20, 2004

Related U.S. Application Data

(63) Continuation of application No. 10/210,326, filed on Aug. 1, 2002, now Pat. No. 6,751,738, which is a continuation of application No. 09/299,941, filed on Apr. 26, 1999, now Pat. No. 6,052,788, which is a continuation of application No. 08/733,361, filed on Oct. 17, 1996, now Pat. No. 5,898,830.

(51) Int. Cl.
H04L 29/06 (2006.01)
H04L 29/00 (2006.01)

(52) U.S. Cl. ............................. 726/15; 726/11; 726/12; 726/14; 709/225; 709/227; 709/238; 713/153; 713/154; 370/351

(58) Field of Classification Search .................... None
See application file for complete search history.

(56) References Cited

U.S. PATENT DOCUMENTS 5,623,601 A * 4/1997 Vu ............................... 726/12
5,898,830 A * 4/1999 Wesinger et al. ............. 726/15

* cited by examiner

*Primary Examiner*—Syed A. Zia
(74) *Attorney, Agent, or Firm*—Sierra Patent Group, Ltd.

(57) ABSTRACT

The present invention provides a firewall that achieves maximum network security and maximum user convenience. The firewall employs "envoys" that exhibit the security robustness of prior-art proxies and the transparency and ease-of-use of prior-art packet filters, combining the best of both worlds. No traffic can pass through the firewall unless the firewall has established an envoy for that traffic. Both connection-oriented (e.g., TCP) and connectionless (e.g., UDP-based) services may be handled using envoys. Establishment of an envoy may be subjected to a myriad of tests to "qualify" the user, the requested communication, or both. Therefore, a high level of security may be achieved. The usual added burden of prior-art proxy systems is avoided in such a way as to achieve fall transparency—the user can use standard applications and need not even know of the existence of the firewall. To achieve full transparency, the firewall is configured as two or more sets of virtual hosts. The firewall is, therefore, "multi-homed," each home being independently configurable. One set of hosts responds to addresses on a first network interface of the firewall. Another set of hosts responds to addresses on a second network interface of the firewall. In one aspect, programmable transparency is achieved by establishing DNS mappings between remote hosts to be accessed through one of the network interfaces and respective virtual hosts on that interface. In another aspect, automatic transparency may be achieved using code for dynamically mapping remote hosts to virtual hosts in accordance with a technique referred to herein as dynamic DNS, or DDNS.

15 Claims, 9 Drawing Sheets

```
PORT            = 80
RULE1           = {
                TIME            = "1AM-12PM"
}
WWW.SRMC.COM                    = {
                .CGI            = "PROCESSCGI"
                ROOT            = "/HOME/SRMC/HTML"
}
WWW.HONOLULU.NET                = {
                .CGI            = ""
                ROOT            = "/HOME/HONOLULU/HTML"
}
WWW.SANJOSE.NET                 = {
                .CGI            = "PROCESSCGI"
                ALLOW           = {
                                *.SRMC.COM
                                205.138.192.*
                                205.138.192.0/23
                }
                DENY            = {
                                MISTERPAIN.COM
                }
}
WWPROXY.SRMC.COM                = {
                MODE            = RT_SERVERPROXY
}
NS.SRMC.COM                     = {
                ALLOW           = {
                                192.168.0.*
                                192.168.1.*    = RULE1
                                192.168.2.*    = {
                                                TIME            = "1AM-12PM"
                                }
                                192.168.3.*    = 192.168.2.*
                }
}
MJU.SRMC.COM                    = {
                ALLOW           = {
                                192.168.0.0/23                  = RULE1
                }
                DENY            = {
                                192.168.0.*    = {
                                                TIME            = "12PM-1AM"
                                }
                }
}
```

FIG. 7

FIREWALL PROVIDING ENHANCED NETWORK SECURITY AND USER TRANSPARENCY

CROSS-REFERENCE TO RELATED APPLICATIONS

This application is a continuation of U.S. patent application Ser. No. 10/210,326, filed Aug. 1, 2002 now U.S. Pat. No. 6,751,738, which is a continuation of U.S. patent application Ser. No. 09/299,941, filed Apr. 26, 1999, now issued as U.S. Pat. No. 6,052,788, which is a continuation of U.S. patent application Ser. No 08/733,361, filed Oct. 17, 1996, now issued as U.S. Pat. No. 5,898,830.

BACKGROUND OF THE INVENTION

1. Field of the Invention

The present invention relates to computer network security and more particularly to firewalls, i.e., a combination of computer hardware and software that selectively allows "acceptable" computer transmissions to pass through it and disallows other non-acceptable computer transmissions.

2. State of the Art

In the space of just a few years, the Internet—because it provides access to information, and the ability to publish information, in revolutionary ways—has emerged from relative obscurity to international prominence. Whereas in general an internet is a network of networks, the Internet is a global collection of interconnected local, mid-level, and wide-area networks that use the Internet Protocol (IP) as the network layer protocol. Whereas the Internet embraces many local- and wide-area networks, a given local- or wide-area network may or may not form part of the Internet. For purposes of the present specification, a "wide-area network" (WAN) is a network that links at least two LANs over a wide geographical area via one or more dedicated connections. The public switched telephone network is an example of a wide-area network. A "local-area network" (LAN) is a network that takes advantage of the proximity of computers to typically offer relatively efficient, higher speed communications than wide-area networks.

In addition, a network may use the same underlying technologies as the Internet. Such a network is referred to herein as an "Intranet," an internal network based on Internet standards. Because the Internet has become the most pervasive and successful open networking standard, basing internal networks on the same standard is very attractive economically. Corporate Intranets have become a strong driving force in the marketplace of network products and services.

The present invention is directed primarily toward the connection of an Intranet to the Internet and the connection of intranets to other intranets, and any network connection where security is an issue.

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. As experience has shown, the frontier of cyberspace has its share of scofflaws, resulting in increased efforts to protect the data, resources, and reputations of those embracing intranets and the Internet.

Firewalls are intended to shield data and resources from the potential ravages of computer network intruders. In essence, a firewall functions as a mechanism, which monitors and controls the flow of data between two networks. All communications, e.g., data packets, which flow between the networks in either direction, must pass through the firewall; otherwise, security is circumvented. The firewall selectively permits the communications to pass from one network to the other, to provide bidirectional security.

Ideally, a firewall would be able to prevent any and all security breaches and attacks. Although absolute security is indeed a goal to be sought after, due to many variables (e.g., physical intrusion into the physical plant) it may be difficult to achieve. However, in many instances, it is of equal if not greater importance to be alerted to an attack so that measures may be taken to thwart the attack or render it harmless, and to avoid future attacks of the same kind. Hence a firewall, in addition to security, should provide timely information that enables attacks to be detected.

Firewalls have typically relied on some combination of two techniques affording network protection: packet filtering and proxy services.

Packet filtering is the action a firewall takes to selectively control the flow of data to and from a network. Packet filters allow or block packets, usually while routing them from one network to another (often from the Internet to an internal network, and vice versa). To accomplish packet filtering, a network administrator establishes a set of rules that specify what types of packets (e.g., those to or from a particular IP address or port) are to be allowed to pass and what types are to be blocked. Packet filtering may occur in a router, in a bridge, or on an individual host computer.

Packet filters are typically configured in a "default permit stance"; i.e., that which is not expressly prohibited is permitted. In order for a packet filter to prohibit potentially harmful traffic, it must know what the constituent packets of that traffic look like. However, it is virtually impossible to catalogue all the various types of potentially harmful packets and to distinguish them from benign packet traffic. The filtering function required to do so is too complex. Hence, while most packet filters may be effective in dealing with the most common types of network security threats, this methodology presents many chinks that an experienced hacker may exploit. The level of security afforded by packet filtering, therefore, leaves much to be desired.

Recently, a further network security technique termed "stateful inspection" has emerged. Stateful inspection performs packet filtering not on the basis of a single packet, but on the basis of some historical window of packets on the same port. Although stateful inspection may enhance the level of security achievable using packet filtering, it is as yet relatively unproven. Furthermore, although an historical window of packets may enable the filter to more accurately identify harmful packets, the filter must still know what it is looking for. Building a filter with sufficient intelligence to deal with the almost infinite variety of possible packets and packet sequences is liable to prove an exceedingly difficult task.

The other principal methodology used in present-day firewalls is proxies. In order to describe prior-art proxy-based firewalls, some further definitions are required. A "node" is an entity that participates in network communications. A subnetwork is a portion of a network, or a physically independent network, that may share network addresses with other portions of the network. An intermediate system is a node that is connected to more than one subnetwork and that has the role of forwarding data from one subnetwork to the other (i.e., a "router").

A proxy is a program, running on an intermediate system, that deals with servers (e.g., Web servers, FTP servers, etc.) on behalf of clients. Clients, e.g. computer applications which are attempting to communicate with a network that is protected by a firewall, send requests for connections to proxy-based intermediate systems. Proxy-based intermediate systems relay approved client requests to target servers and relay answers back to clients.

Proxies require either custom software (i.e., proxy-aware applications) or custom user procedures in order to establish a connection. Using custom software for proxying presents several problems. Appropriate custom client software is often available only for certain platforms, and the software available for a particular platform may not be the software that users prefer. Furthermore, using custom client software, users must perform extra manual configuration to direct the software to contact the proxy on the intermediate system. With the custom procedure approach, the user tells the client to connect to the proxy and then tells the proxy which host to connect to. Typically, the user will first enter the name of a firewall that the user wishes to connect through. The firewall will then prompt the user for the name of the remote host the user wishes to connect to. Although this procedure is relatively simple in the case of a connection that traverses only a single firewall, as network systems grow in complexity, a connection may traverse several firewalls. Establishing a proxied connection in such a situation starts to become a confusing maze, and a significant burden to the user, since the user must know the route the connection is to take.

Furthermore, since proxies must typically prompt the user or the client software for a destination using a specific protocol, they are protocol-specific. Separate proxies are therefore required for each protocol that is to be used.

Another problematic aspect of conventional firewall arrangements, from a security perspective, is the common practice of combining a firewall with other packages on the same computing system. The firewall package itself may be a combination of applications. For example, one well-known firewall is a combination Web server and firewall. In other cases, unrelated services may be hosted on the same computing platform used for the firewall. Such services may include e-mail, Web servers, databases, etc. The provision of applications in addition to the firewall on a computing system provides a path through which a hacker can potentially get around the security provided by the firewall. Combining other applications on the same machine as a firewall also has the result of allowing a greater number of users access to the machine. The likelihood then increases that a user will, deliberately or inadvertently, cause a security breach.

There remains a need for a firewall that achieves both maximum security and maximum user convenience, such that the steps required to establish a connection are transparent to the user. The present invention addresses this need.

SUMMARY OF THE INVENTION

The present invention, generally speaking, provides a firewall that achieves maximum network security and maximum user convenience. The firewall employs "envoys" that exhibit the security robustness of prior-art proxies and the transparency and ease-of-use of prior-art packet filters, combining the best of both worlds. No traffic can pass through the firewall unless the firewall has established an envoy for that traffic. Both connection-oriented (e.g., TCP) and connectionless (e.g., UDP-based) services may be handled using envoys. Establishment of an envoy may be subjected to a myriad of tests to "qualify" the user, the requested communication, or both. Therefore, a high level of security may be achieved.

Security may be further enhanced using out-of-band authentication. In this approach, a communication channel, or medium, other than the one over which the network communication is to take place, is used to transmit or convey an access key. The key may be transmitted from a remote location (e.g., using a pager or other transmission device) or may be conveyed locally using a hardware token, for example. To gain access, a hacker must have access to a device (e.g., a pager, a token etc.) used to receive the out-of-band information. Pager beep-back or similar authentication techniques may be especially advantageous in that, if a hacker attempts unauthorized access to a machine while the authorized user is n possession of the device, the user will be alerted by the device unexpectedly receiving the access key. The key is unique to each transmission, such that even if a hacker is able to obtain it, it cannot be used at other times or places or with respect to any other connection.

Using envoys, the added burden associated with prior-art proxy systems is avoided so as to achieve full transparency the user can use standard applications and need not even know of the existence of the firewall. To achieve full transparency, the firewall is configured as two sets of virtual hosts. The firewall is, therefore, "multi-homed," each home being independently configurable. One set of hosts responds to addresses on a first network interface of the firewall. Another set of hosts responds to addresses on a second network interface of the firewall. In accordance with one aspect of the invention, programmable transparency is achieved by establishing DNS mappings between remote hosts to be accessed through one of the network interfaces and respective virtual hosts on that interface. In accordance with another aspect of the invention, automatic transparency may be achieved using code for dynamically mapping remote hosts to virtual hosts in accordance with a technique referred to herein as dynamic DNS, or DDNS.

The firewall may have more than two network interfaces, each with its own set of virtual hosts. Multiple firewalls may be used to isolate multiple network layers. The full transparency attribute of a single firewall system remains unchanged in a multi-layered system: a user may, if authorized, access a remote host multiple network layers removed, without knowing of the existence of any of the multiple firewalls in the system.

Furthermore, the firewalls may be configured to also transparently perform any of various kinds of channel processing, including various types of encryption and decryption, compression and decompression, etc. In this way, virtual private networks may be established whereby two remote machines communicate securely, regardless of the degree of proximity or separation, in the same manner as if the machines were on the same local area network.

The problem of Internet address scarcity may also be addressed using multi-layer network systems of the type described. Whereas addresses on both sides of a single firewall must be unique in order to avoid routing errors, network segments separated by multiple firewalls may reuse the same addresses.

BRIEF DESCRIPTION OF THE DRAWINGS

The present invention may be further understood from the following description in conjunction with the appended drawings. In the drawings:

FIG. 7 is an example of a portion of the master configuration file of FIG. 5;

DETAILED DESCRIPTION OF THE PREFERRED EMBODIMENTS

The present firewall provides a choke point used to control the flow of data between two networks. One of the two networks may be the Internet, or both of the two networks may be intranets the nature and identity of the two networks is immaterial. The important point is that all traffic between the two networks must pass through a single, narrow point of controlled access. A firewall therefore brings a great deal of leverage to bear on the problem of network security, allowing security measures to be concentrated on this controlled access point. To avoid possible security compromises, the firewall should ideally run on a dedicated computer, i.e. one which does not have any other user-accessible programs running on it that could provide a path via which communications could circumvent the firewall.

One environment in which firewalls are particularly desirable is in enterprise network systems, in which a number of individual networks that may be respectively associated with different departments or divisions of a company, for example, are connected with one another. In such an environment, firewalls can be employed to restrict access to the individual networks. While not limited to this particular situation, the present invention will be, described hereinafter in such a context, to facilitate an understanding of its underlying principles.

Figure 1:
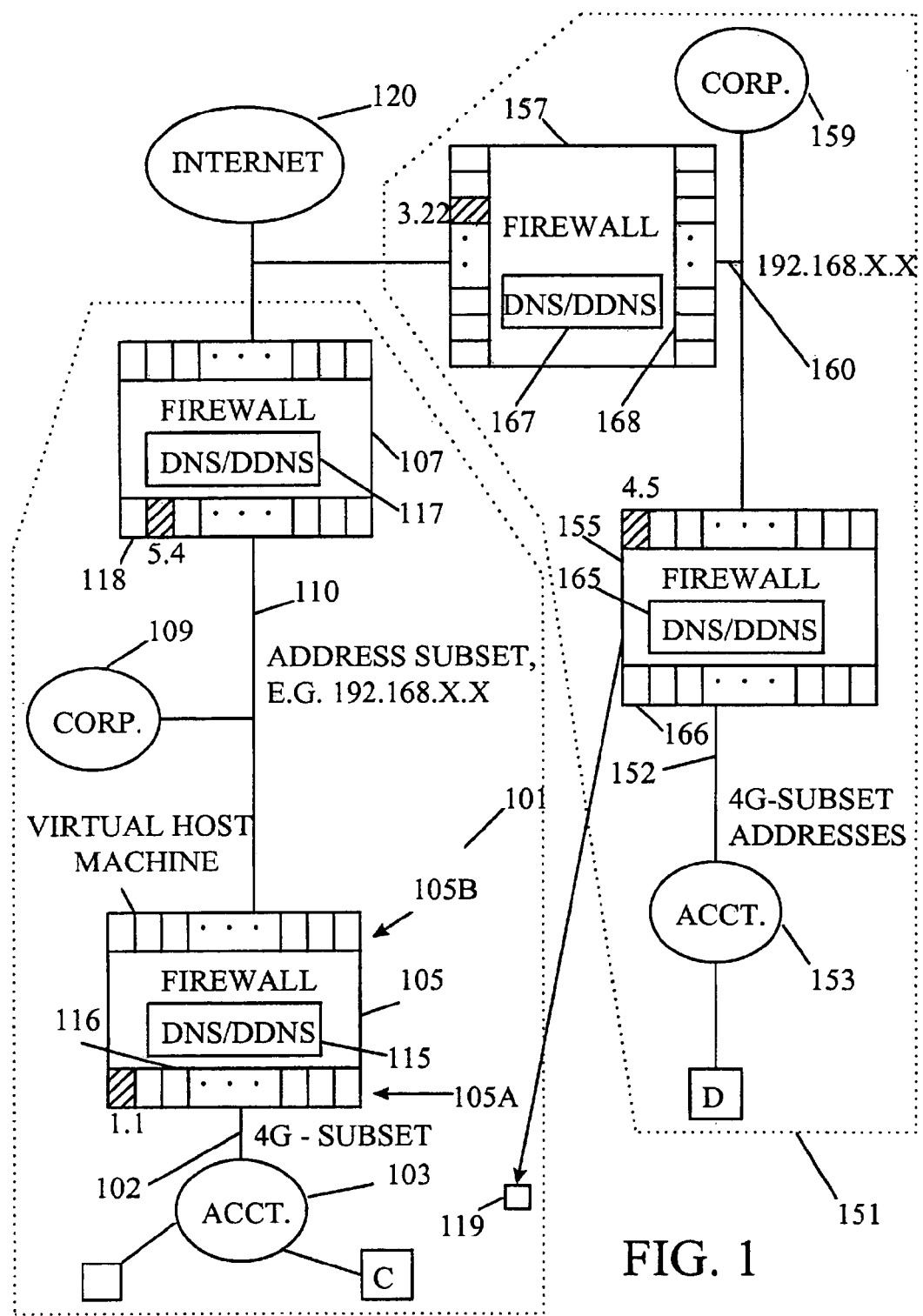
FIG. 1 is a block diagram of a multi-layered computer enterprise network in which the present invention may be used.

Referring now to FIG. 1, assume that the accounting departments of two remote corporate sites are networked, and that these two different accounting networks are to be connected via the Internet or a similar non-secure, wide-area network. For purposes of illustration, a first site 101 having a first accounting network 103 might be located in California, and a second site 151 having a second accounting network 153 might be located in Japan. Within each site, each accounting network may be part of a larger corporate network (109, 159). Precautions are required to safeguard sensitive accounting data such that it cannot be accessed over the general corporate network. A first firewall (105, 155) is used for this purpose. The first firewall is interposed between the accounting network and the general corporate network.

A convenient way to place the two accounting networks in communication with each other is through the Internet 120, which comprises another layer of a multi-layer network. As compared to other forms of connection, the Internet may be more economical, more easily accessible, and more robust. Connecting to the Internet, however, requires that access between the Internet and the respective sites be strictly controlled. A second firewall (107, 157) is used at each site for this purpose.

In the following description, the present firewall is illustrated most often as a rectangle having along each of two edges thereof a network connection and a row of boxes representing multiple "homes," corresponding to respective virtual hosts. A virtual host along one edge may be used to initiate a connection only in response to a request from the network connection that enters the firewall at that edge. The connection, once established, is fully bidirectional, with the same virtual host passing data between the originating network connection and the network connection at the opposite edge of the firewall.

More generally, the firewall may be N-sided, having N network connections and being illustrated as an N-sided polygon. Any virtual host may establish a connection between any pair of network connections so long as the connection originated from the network connection adjoining that virtual host. Again, the connection, once established, is fully bidirectional.

The firewalls 105, 107, 155 and 157 are each of a construction to be more particularly described hereinafter. Each firewall is multi-homing. This means that each firewall is configured as multiple virtual hosts running on a physical computer. In the example of FIG. 1, a firewall is depicted as a single computer having multiple virtual hosts on each of its two interfaces. In practice, the multiple virtual hosts can be configured in this manner or, alternatively, implemented in any number of computers, as explained in detail hereinafter. Each virtual host corresponds to a "home", i.e. a site via which a connection is made between the two networks on either side of the firewall. At different times, the same virtual host might correspond to different homes associated with different connections. At any given time, however, a virtual host represents one home. In the following description of the particular example illustrated in FIG. 1, therefore, homes and virtual hosts are described as being synonymous with one another. Each virtual host is fully independently configurable and unique from each of the other virtual hosts. Considering the firewall 105 as being exemplary of each of the firewalls 105, 107, 155 and 157, one set of hosts 105a responds to addresses on a first network interface of the firewall. Another set of hosts 105b responds to addresses on a second network interface of the firewall.

Normally, in accordance with the prior art, connecting from one computer to another remote computer along a route traversing one or more firewalls would require the user to configure a prior-art proxy for each firewall to be traversed. In accordance with one aspect of the invention, however, programmable transparency is achieved by establishing DNS mappings between remote hosts to be accessed through one of the network interfaces and respective virtual hosts on that interface.

DNS is a distributed database system that translates host names to IP addresses and IP addresses to host names (e.g, it might translate host name omer.odyssey.com to 129.186.424.43). The information required to perform such translations is stored in DNS tables. Any program that uses host names can be a DNS client. DNS is designed to translate and forward queries and responses between clients and servers.

When a client needs a particular piece of information (e.g., the IP address of homer.odyssey.com), it asks its local DNS server for that information. The local DNS server first examines its own local memory, such as a cache, to see if it already knows the answer to the client's query. If not, the local DNS server asks other DNS servers, in turn, to discover the answer to the client's query. When the local DNS server gets the answer (or decides that for some reason it cannot), it stores any information it received and answers the client. For example, to find the IP address for homer.odyssey.com, the local DNS server first asks a public root name server which machines are name servers for the corn domain. It then asks one of those "com" name servers which machines are name servers for the odyssey.com domain, and then it asks one of those name servers for the IP address of homer.odyssey.com.

This asking and answering is all transparent to the client. As far as the client is concerned, it has communicated only with the local server. It does not know or care that the local server may have contacted several other servers in the process of answering the original question.

Referring still to FIG. 1, the firewall 105 is associated with a respective domain name server 115. Each of the other firewalls 107, 155, 157 is also associated with a respective domain name server 117, 165, 167. The domain name server may be a dedicated virtual host on the same physical machine as the firewall. Alternatively, the domain name server may be a separate machine. A domain name server is provided for each layer in the multi-layer network.

In operation, assume now that a client C on the accounting network 103 is to connect to a host D on the accounting network 153 on a repeated basis. The DNS tables of each of the firewalls may then be programmed so as to enable such a connection to be established transparently, without the user so much as being aware of any of the firewalls 105, 107, 155, 157—hence the term programmable transparency. Both forward and reverse table entries are made in the domain name servers. Within a domain name server 115, for example, D (the name of the remote host, e.g., mach1.XYZcorp.com) might be mapped to a virtual host having a network address that concludes with the digits 1.1, and vice versa. Within the domain name server 117, D might be mapped to 5.4, within the domain name server 167, D might be mapped to 3.22, and within the domain name server 165, D might be mapped to 4.5, where each of the foregoing addresses has been randomly chosen simply for purposes of illustration. Finally, within a conventional DNS server (not shown), D is mapped to the "real" network address (e.g, the IP address) of D, say, 55.2.

When client C tries to initiate a connection to host D using the name of D, DNS operates in the usual manner to propagate a name request to successive levels of the network until D is found. The DNS server for D returns the network address of D to a virtual host on the firewall 155. The virtual host returns its network address to the virtual host on the firewall 157 from which it received the lookup request, and so on, until a virtual host on the firewall 105 returns its network address (instead of the network address of D) to the client C. This activity is all transparent to the user.

Note that at each network level, the virtual host handling a connection is indistinguishable to the preceding virtual (or real) host from D itself. Thus, to the client C, the virtual host 1.1 is D, to the virtual host 1.1, the virtual host 5.4 is D, etc.

There is no limit to the number of network layers that may be traversed in this fashion, or any difference in operation as the number of network layers increases. This multi-layering capability allows two remote machines to communicate with the same ease as if the machines were on the same local area network, regardless of the degree of proximity or separation.

Programmable transparency is based upon what may be termed "envoys." Important differences exist between envoys as described herein and conventional proxies. Normally, a prior-art proxy would have to prompt the user to enter a destination. To enable such prompting to occur, different proxy code has conventionally been required for each protocol to be proxied. Using programmable transparency, the destination is provided to an envoy using DNS and/or DDNS as described more fully hereinafter. There is therefore no need to always prompt the user for a destination and no need for the user to always enter a destination (although a mode of operation may be provided in which the user is prompted for and does enter a destination). Instead of a collection of conventional protocol-specific proxies, a single generic envoy program may be used.

The foregoing discussion has focused on the programmable transparency aspects of the present firewall. Of course, a primary function of a firewall is to selectively allow and disallow communications. Hence, in the course of establishing a connection, each virtual host examines a configuration table to determine, based on the particulars of the requested connection—source, destination, protocol, time-of-day, port number, etc.—whether such a connection will be allowed or disallowed. The process by which connection requests may be scrutinized is described in greater detail in U.S. patent application Ser. No. 08/595,957, filed Feb. 6, 1996, now issued as U.S. Pat. No. 5,826,014, and incorporated herein by reference.

Figure 2:
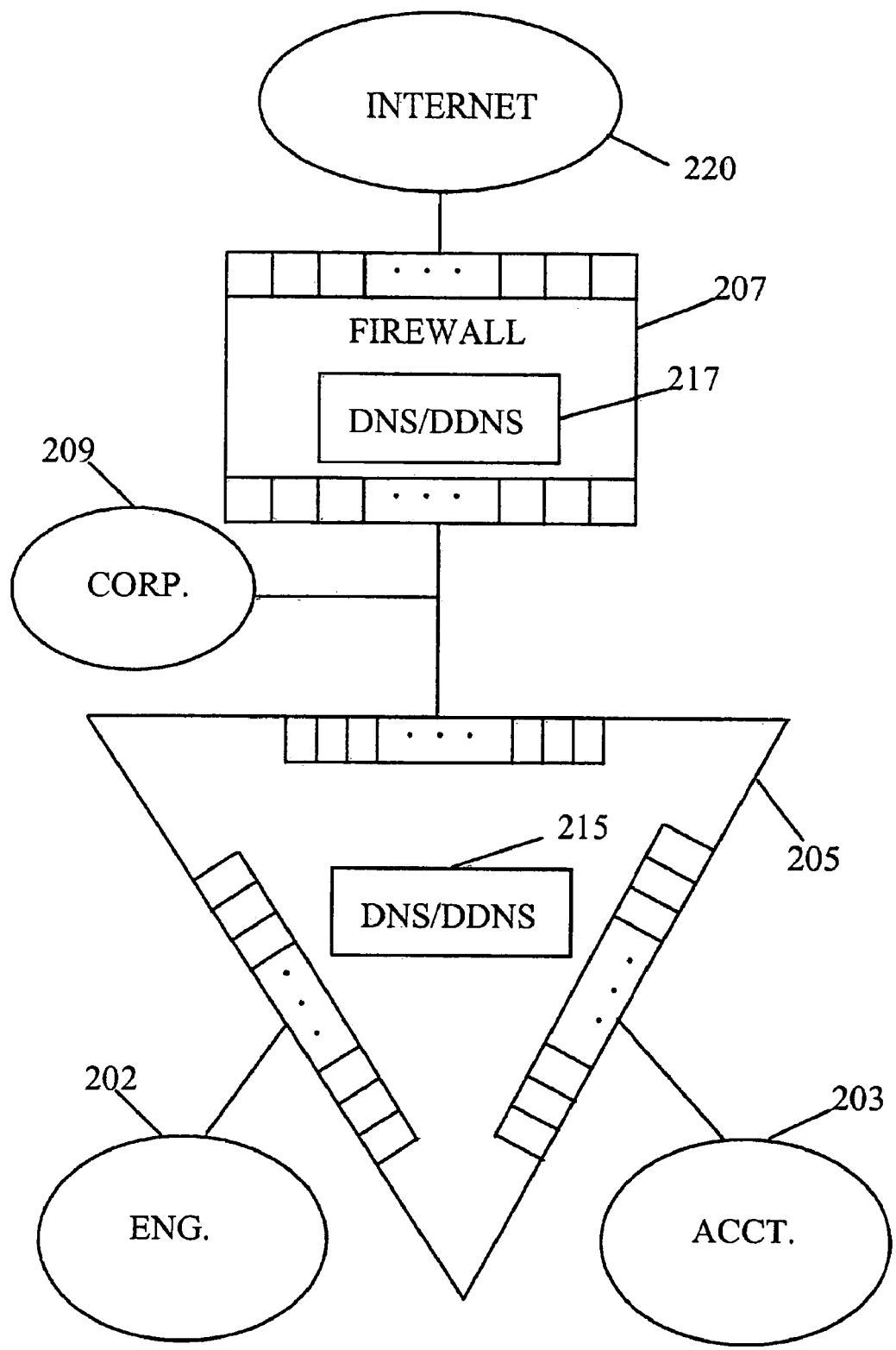
FIG. 2 is a block diagram of a network similar to the network of FIG. 1 but in which a two-sided firewall has been replaced by a three-sided firewall.

The firewall may have more than two network interfaces, each with its own set of virtual hosts. Referring to FIG. 2, for example, the two-sided firewall discussed previously in relation to FIG. 1 has been replaced by a three-sided firewall 205. An accounting department network 203 and a general corporate network 209 are connected to the firewall 205 as previously described. Also connected to the firewall 205 is an engineering department network 202. In general, a firewall may be N-sided, having N different network connections. For each network connection there may be multiple virtual hosts, which operate in the manner described above.

Referring again to FIG. 1, configuration of the firewalls may be easily accomplished by providing on each firewall a special-purpose virtual host that runs "Configurator" software-software that provides a Web-based front-end for editing configuration files for the other virtual hosts on the firewall. The special-purpose virtual host (116, 118, 166 and 168 in FIG. 1) is preferably configured so as to allow only a connection from a specified secure client. The Configurator software running on the special-purpose virtual host is HTML-based in order to provide an authorized system administrator a familiar "point-and-click" interface for configuring the virtual firewalls in as convenient a manner as possible using a standard Web browser. Since Web browsers are available for virtually every platform, there results a generic GUI interface that takes advantage of existing technology.

Figure 3:
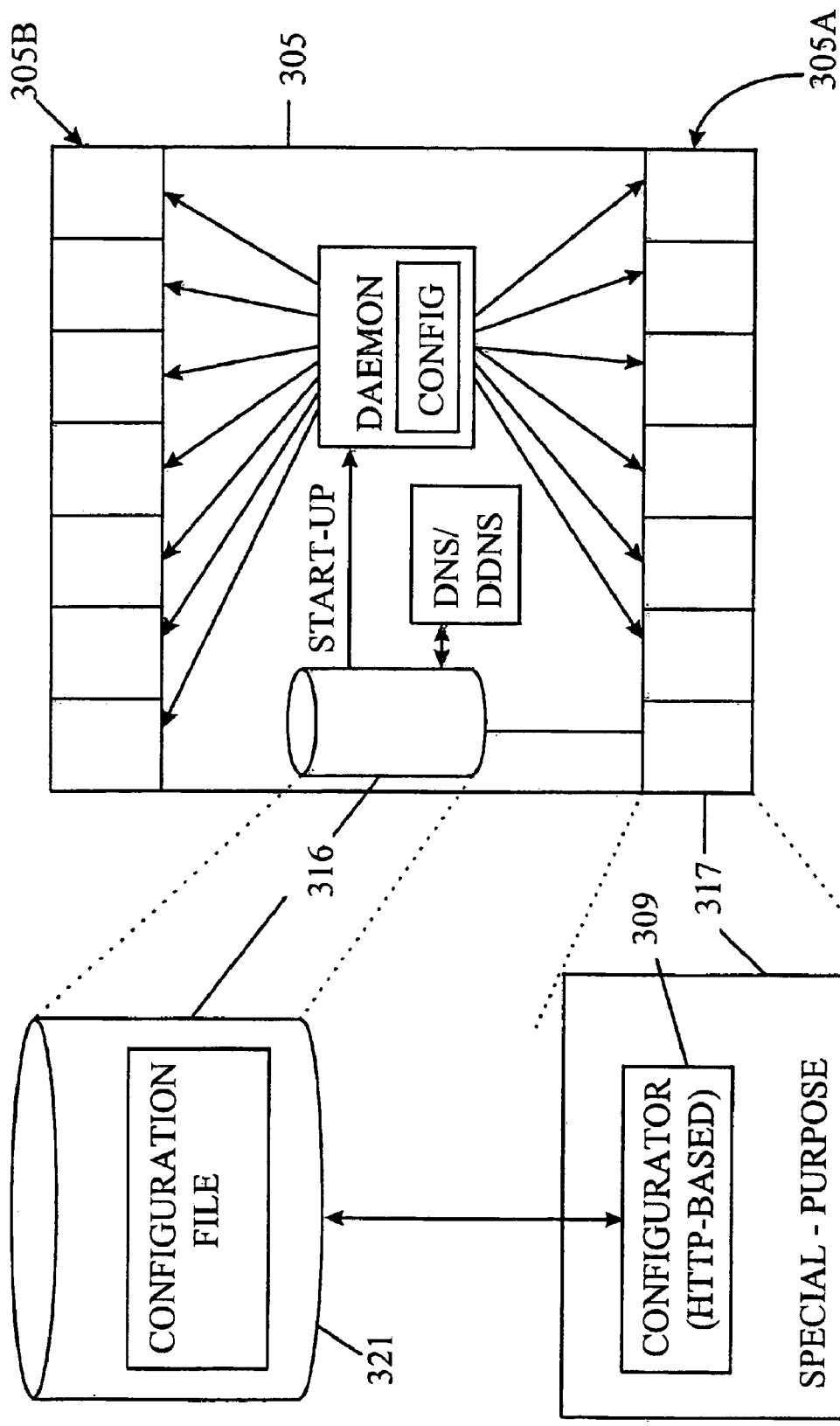
FIG. 3 is a block diagram showing in greater detail a special-purpose virtual host used for configuration of a firewall.

Referring more particularly to FIG. 3, there is shown a firewall 305 having a first set of virtual hosts 305a, a second set of virtual hosts 305b, and a DNS/DDNS module 315. The virtual hosts do not require and preferably do not have access to the disk files of the underlying machine. Instead, virtual host processes are spawned from a daemon process that reads a master configuration file from disk once at start-up. The DNS/DDNS module and the special-purpose virtual host 317 do have access to disk files 316 of the underlying physical machine. The special-purpose virtual host 317, shown in exploded view, runs an HTML-based Configurator module 319. Access to the special-purpose virtual host is scrutinized in accordance with rules stored on disk within configuration files 321. Typically, these rules will restrict access to a known secure host, will require at least username/password authentication and optionally more rigorous authentication. Once access is granted, the Configurator module will send to the authorized accessing host a first HTML page. From this page, the user may navigate through different HTML pages using a conventional Web browser and may submit information to the special-purpose virtual host. The special-purpose virtual host will then use this information to update the configuration files 321.

As will be appreciated more fully from the description of FIG. 7 hereinafter, configuration is based on host names, not IP addresses. As a result, two mappings are required in order to handle a connection request. The requester needs an IP address. To this end, a first mapping maps from the host name received in the connection request to the IP address of a virtual host. The virtual host, however, needs the host name of the host to be connected to. To this end, the second mapping maps back to the host name in order to read an appropriate configuration file or sub-file based on the host name. Thus, when a connection request is received for homer. odyssey.com, DNS/DDNS in effect says to the requestor "Use virtual host X.X.X.X," where X.X.X.X represents an IP address. Then, when the virtual host receives the request, it performs a reverse lookup using DNSIDDNS, whereupon DNSIDDNS in effect says "Virtual host X.X.X.X, use the configuration information for homer. odyssey.com."

Security may be further enhanced, both with respect to connections to the special-purpose virtual host for configuration purposes and also with respect to connections generally, by using out-of-band user authentication. Out-of-band authentication uses a channel, a device or any other communications method or medium which is different from that over which the inter-network communication is to take place to transmit or convey an access key. Hence, in the example of FIG. 1, the firewall 155, upon receiving a connection request from a particular source, might send a message, including a key, to a pager 119 of the authorized user of the source client. The user might be requested to simply enter the key. In more sophisticated arrangements, the user may be required to enter the key into a special hardware token to generate a further key. To gain access, a hacker must therefore steal one or more devices (e.g, a pager used to receive the out-of-band transmissions, a hardware token, etc.). Furthermore, if a hacker attempts unauthorized access to a machine while the authorized user is in possession of the pager or other communications device, the user will be alerted by the device unexpectedly receiving a message and access key.

Other methods may be used to communicate out-of-band so as to deliver the required access key. For example, the firewall 155 might send a fax to the fax number of the user of the source machine. Alternatively, identifying information may be sent to the user across the network, after which the user may be required to dial an unpublished number and enter the identifying information in order to receive a voice message containing the required key.

In each of the foregoing methodologies, the key is connection-specific. That is, once the connection is closed or the attempt to establish a connection is abandoned, if a user again attempts to establish a connection, the key that previously applied or would have applied is no longer applicable.

The different virtual hosts may also be configured to perform channel processing of various sorts as traffic traverses different network segments. Channel processing may include encryption, decryption, compression, decompression, image or sound enhancement, content filtering, etc. Channel processing is the processing performed on data flowing through a communications channel to enhance some attribute of the data, such as security, reproduction quality, etc. In some instances, channel processing may actually affect the content of the data, for example "bleeping" obscenities by replacing them with a distinctive character string. Alternatively, channel processing may intervene to cause a connection to be closed if the content to be sent on that connection is found to be objectionable.

Channel processing may be performed using existing standard software modules. In the case of encryption and decryption, for example, modules for DES, RSA, Cylink, SET, SSL, and other types of encryption/decryption and authentication may be provided on the firewall. In the case of compression and decompression, standard modules may include MPEG, JPEG, LZ-based algorithms, etc. Based on information contained in the configuration files, information passing through the firewall may be processed using one or more such modules depending on the direction of data flow.

Channel processing may be used to perform protocol translation, for example between IP and some other protocol or protocols. One problem that has recently received attention is that of using IP for satellite uplink and downlink transmissions. The relatively long transit times involved in satellite transmissions can cause problems using IP. One possible solution is to perform protocol translation between IP and an existing protocol used for satellite transmissions. Such protocol translation could be performed transparently to the user using a firewall of the type described.

Channel processing may also be used to perform virus detection. Blanket virus detection across all platforms is a daunting task and may not be practical in most cases. A system administrator may, however, configure the system to perform specified virus checking for specified hosts.

Encryption and decryption are particularly important to realizing the potential of the Internet and network communications. In the example just described, on the network segment between firewall 105 and 107, DES encryption might be used, in accordance with the configuration file on firewalls 105 and 107. Across the Internet, between firewall 107 and firewall 155, triple DES may be applied. On the network segment between firewall 155 and 157 RSA encryption may be used. Alternatively, encryption could be performed between firewalls 105 and 155 and also between 107 and 155 and also between 157 and 155. Thus the firewall 157 may then decrypt the cumulative results of the foregoing multiple encryptions to produce clear text to be passed on to host D. Combining encryption capabilities with programmable transparency as described above allows for the creation of virtual private networks-networks in which two remote machines communicate securely through cyberspace in the same manner as if the machines were on the same local area network.

Using DDNS, mappings between a host machine and a virtual host are performed dynamically, on-the-fly, as required. Any of various algorithms may be used to select a virtual host to handle a connection request, including, for example, a least-recently-used strategy. A time-out period is established such that, if a connection has been closed and is not reopened within the time-out period, the virtual host that was servicing that connection may be re-mapped so as to service another connection—i.e., it becomes associated with a different node. In this manner, the number of clients that may be serviced is vastly increased. In particular, instead of the number of clients that may use a particular network interface being limited to the number of virtual hosts on that interface as would be the case using static DNS entries, using DDNS, any number of hosts may use a particular network interface subject to availability of a virtual host. Moreover, instead of making static DNSentries at each level of a multi-level network, using DDNS, such entries are rendered unnecessary.

DDNS allows for dynamic load sharing among different physical machines. Hence, instead of a single physical machine, one or more of the firewalls in FIG. 1 might be realized by two or more physical machines. When performing mapping, DDNS can take account of the load on the physical machine using conventional techniques. If one physical machine fails, the functions of that machine may still be performed by virtual hosts running on another physical machine. DDNS likewise allows a firewall to be scaled-up very easily, by adding one or more additional physical machines and configuring those machines as additional virtual hosts having identical configurations as on the existing physical machine or machines, but different network addresses.

Figure 4:
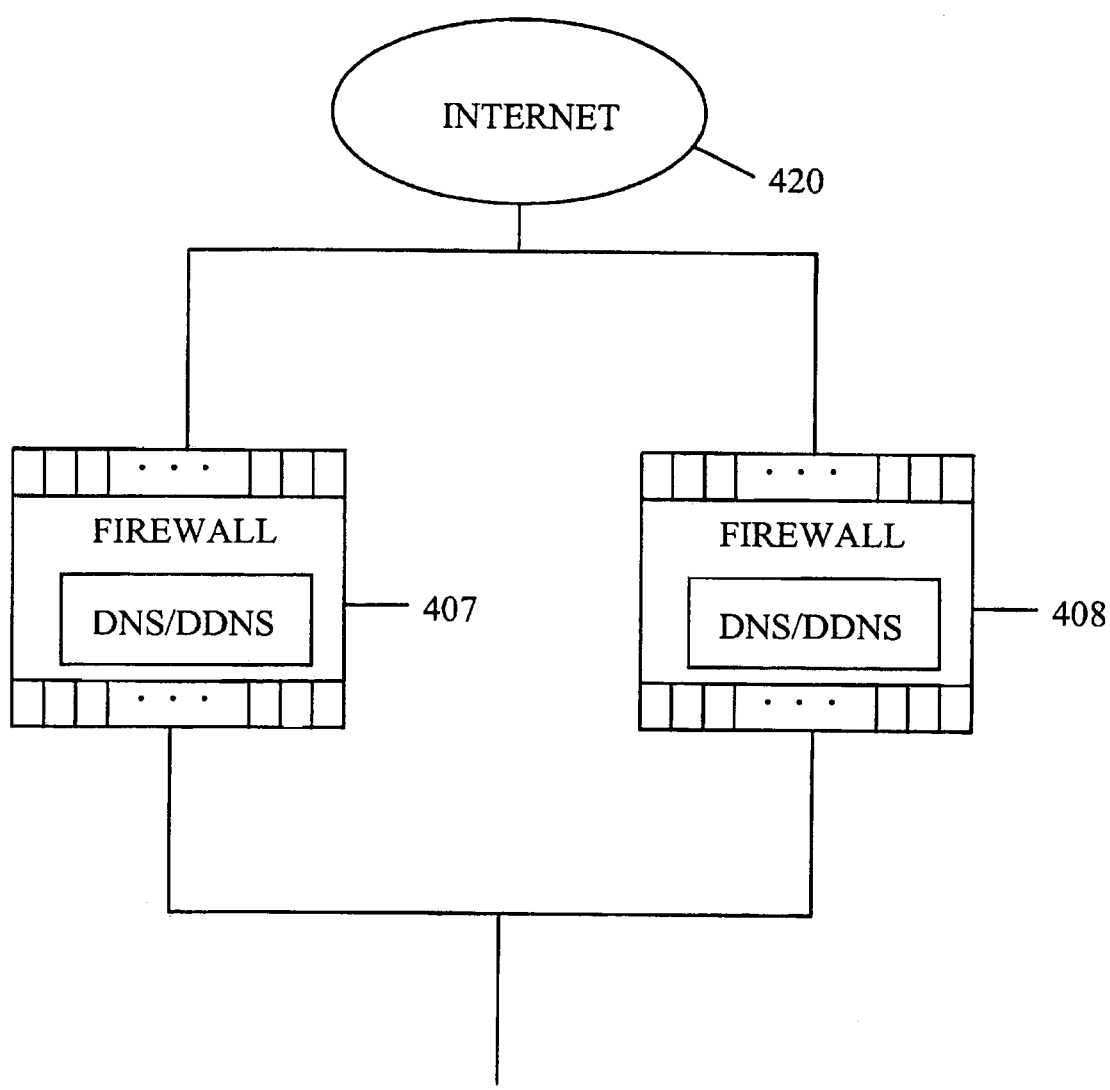
FIG. 4 is a block diagram of a load-sharing firewall.

Referring more particularly to FIG. 4, a load-sharing firewall is realized using a first firewall 407 and a second firewall 408 connected in parallel to a network 420 such as the Internet. Redundancy is provided by conventional DNS procedures. That is, in DNS, redundant name servers are required by the DNS specification. If a query addressed to one of the redundant name servers does not receive a response, the same query may then be addressed to another name server. The same result holds true in FIG. 4. If one of the physical firewall machines 407 or 408 is down, the other machine enables normal operation to continue.

The configuration of FIG. 4, however, further allows the physical firewall machines 407 and 408 to share the aggregate processing load of current connections. Load sharing may be achieved in the following manner. Each of the DNS modules of all of the machines receive all DNS queries, because the machines are connected in parallel. Presumably, the DNS module of the machine that is least busy will be the first to respond to a query. An ensuing connection request is then mapped to a virtual host on the responding least-busy machine.

As the popularity and use of the Internet continues to grow, there is a concern that all available addresses will be used, thereby limiting further expansion. An important result of DDNS is that network addresses may be reused on network segments between which at least one firewall intervenes. More particularly, the addresses which are employed on opposite sides of a firewall are mutually exclusive of one another to avoid routing errors. Referring again to the example of FIG. 1, users of the Internet 120 are unaware of the addresses employed on a network segment 110. Certain addresses can be reserved for use behind a firewall. As shown in FIG. 1, for example, the subset of addresses represented as 192.168.X.X can be used on the network segment 110. So long as an address is not used on both sides of the same firewall, no routing errors will be introduced. Therefore, the same set of addresses can be used on the network segment 160, which is separated from the Internet via the firewall 157. On network segment 102 and network segment 152, the entire address space may be used, less those addresses used on the segments 110, 120 of the respective firewalls 105 and 155. Thus by isolating Internet Service Providers (ISPs) from the Internet at large using firewalls of the type described, each ISP could make use of almost the full address space of the Internet ($2^{32}$ addresses). Exhaustion of network addresses, presently a grave concern within the Internet community, is therefore made highly unlikely.

Figure 9:
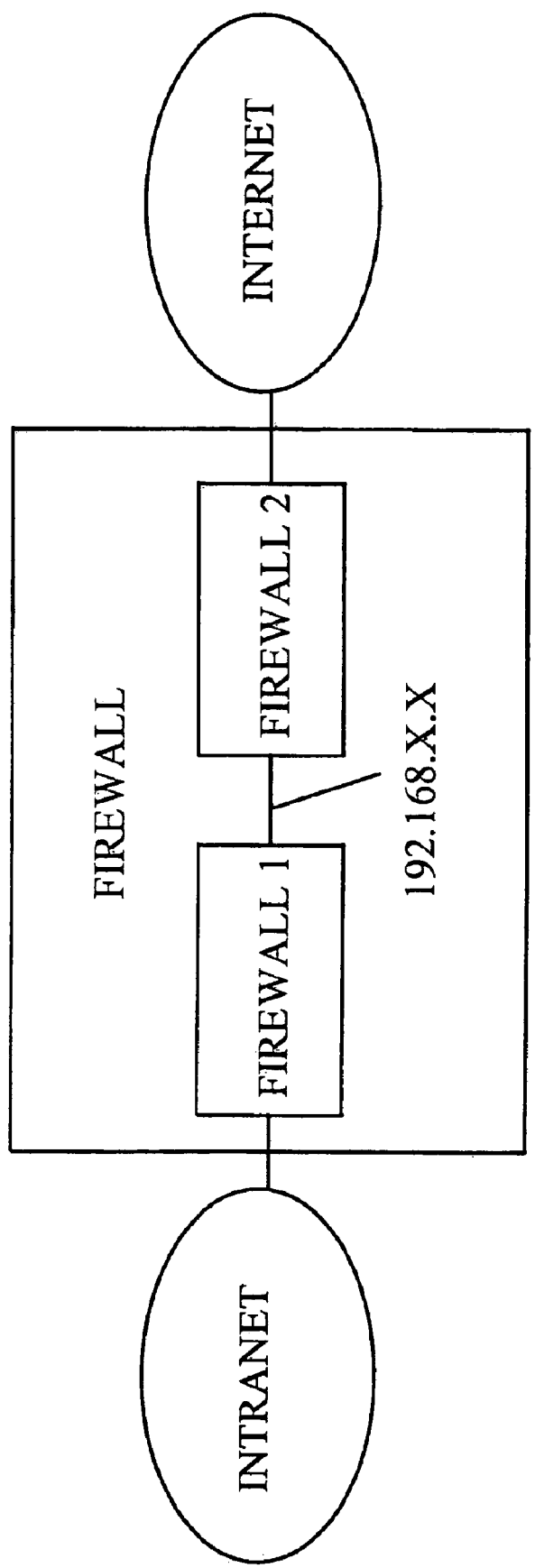
FIG. 9 is a block diagram of a combination firewall that allows the bulk of the entire Internet address space to be used on both sides of the firewall.

Address reuse may be further facilitated by providing multiple multi-homing firewall programs running on a single physical machine and defining a virtual network connection between the two firewall programs using an IP address within the range 192.168.X.X as described previously. To the user and to the outside world, this "compound firewall" appears as a single multi-homing firewall of the type previously described. However, since internally the firewall is really two firewalls, the entire Internet address space may be used on both sides of the firewall, except for the addresses 192.168.X.X. This configuration is illustrated in FIG. 9.

In essence, the use of firewalls as presently described allows the prevailing address model of network communications to be transformed from one in which IP addresses are used for end-to-end transport to one in which host names are used for end-to-end transport, with IP addresses being of only local significance. The current use of IP addresses for end-to-end transport may be referred to as address-based routing. Using address-based routing, address exhaustion becomes a real and pressing concern. The use of host names for end-to-end transport as presently described may be referred to as name-based routing. Using name-based routing, the problem of address exhaustion is eliminated.

The firewall as described also allows for envoys to handle connectionless (e.g., UDP-User Datagram Protocol) traffic, which has been problematic in the prior art. UDP is an example of a connectionless protocol in which packets are launched without any end-to-end handshaking. In the case of many prior-art firewalls, UDP traffic goes right through the firewall unimpeded. The present firewall handles connectionless traffic using envoys. Rules checking is performed on a first data packet to be sent from the first computer to the second computer. If the result of this rules checking is to allow the first packet to be sent, a time-out limit associated with communications between the first computer and the second computer via UDP is established, and the first packet is sent from one of the virtual hosts to the second computer on behalf of the first computer. Thereafter, for so long as the time-out limit has not expired, subsequent packets between the first computer and the second computer are checked and sent. A long-lived session is therefore created for UDP traffic. After the time-out limit has expired, the virtual host may be remapped to a different network address to handle a different connection.

Figure 5:
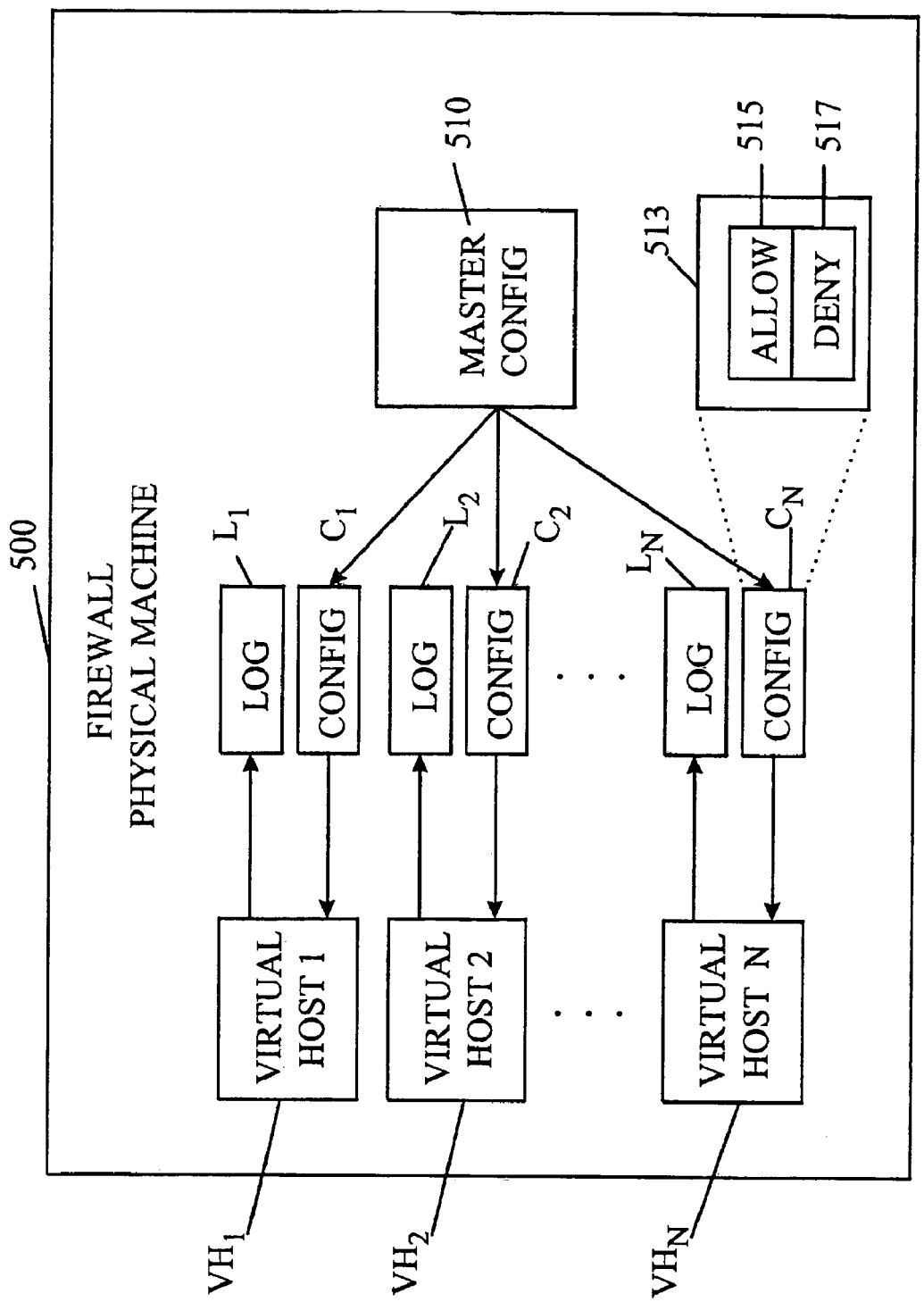
FIG. 5 is a block diagram of one embodiment of the firewall of the present invention.

The construction of a typical firewall in accordance with the present invention will now be described in greater detail. Referring to FIG. 5, the firewall is a software package that runs on a physical machine 500. One example of a suitable machine is a super-minicomputer such as a SparcServer machine available from Sun Microsystems of Menlo Park, Calif. The firewall may, however, run on any of a wide variety of suitable platforms and operating systems. The present invention is not dependent upon a particular choice of platform and operating system.

Conventionally, the logical view of the firewall on the Internet, an intranet, or some other computer network is the same as the physical view of the underlying hardware. A single network address has been associated with a single network interface. As a result, no mechanism has existed for distinguishing between communications received on a single network interface and hence directing those communications to different logical machines.

As described previously, this limitation may be overcome by recognizing multiple addresses on a single network interface, mapping between respective addresses and respective virtual hosts, and directing communications to different addresses to different virtual hosts. Therefore, the present firewall, although it runs on a limited number of physical machines, such as a single computer 500, appears on the network as a larger number of virtual hosts VH1 through VHn. Each virtual host has a separate configuration sub-file (sub-database) C1, C2, etc., that may be derived from a master configuration file, or database, 510. The configuration sub-files are text files that may be used to enable or disable different functions for each virtual host, specify which connections and types of traffic will be allowed and which will be denied, etc. Because the configuration files are text files, they may be easily modified at any time following initial installation.

Preferably, each virtual host also has its own separate log file L1, L2, etc. This feature allows for more precise and more effective security monitoring.

The firewall is capable of servicing many simultaneous connections. The number of allowable simultaneous connections is configurable and may be limited to a predetermined number, or may be limited not by number but only by the load currently experienced by the physical machine. The number of maximum allowable connections or the maximum allowable machine load may be specified in the configuration file.

As described in greater detail in connection with FIG. 7, each configuration file C1, C2, etc., may have an access rules database 513, including an Allow portion 515, a Deny portion 517, or both. Using the access rules database 513, the firewall selectively allows and denies connections to implement a network security policy.

Figure 6:
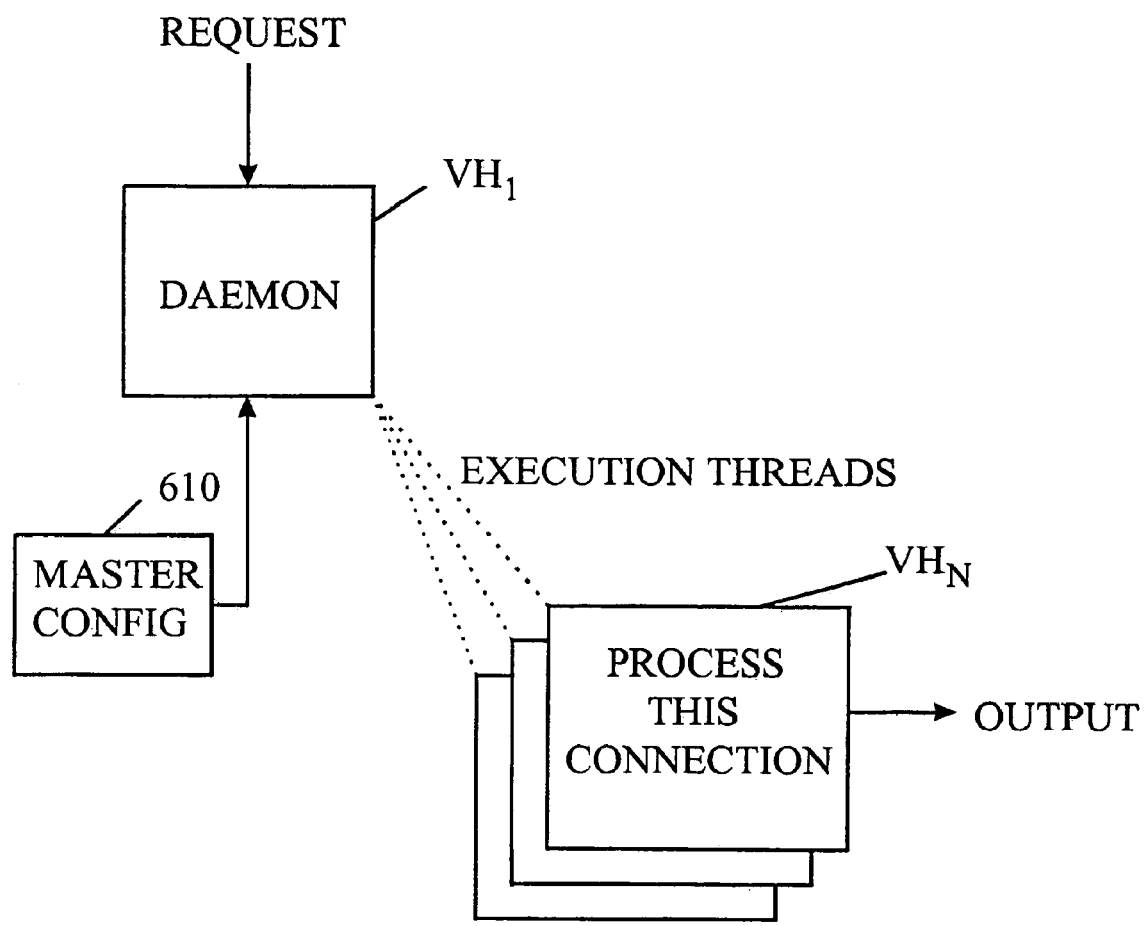
FIG. 6 is a block diagram illustrating the manner in which the present firewall handles connection requests.

The firewall is self-daemoning, meaning that it is not subject to the limitations ordinarily imposed by the usual Internet meta-daemon, INETD, or other operating-system limitations. Referring to FIG. 6, when the firewall is brought up, it first reads in the master configuration file and then becomes a daemon and waits for connection requests. When a connection request is received, the firewall spawns a process, or execution thread, to create a virtual host VHn to handle that connection request. Each process runs off the same base code. However, each process will typically use its own sub-database from within the master configuration database to determine the configuration of that particular virtual host. Processes are created "on demand" as connection requests are received and terminate as service of those connection requests is completed.

An example of a portion of a master configuration file is shown in FIG. 7. Within the master configuration file database, different portions of the file form sub-databases for different virtual hosts. Each sub-database may specify a root directory for that particular virtual host. Also as part of the configuration file of each virtual host, an access rules database is provided governing access to and through the virtual host, i.e., which connections will be allowed and which connections will be denied. The syntax of the access rules database is such as to allow greater flexibility in specifying not only what machines are or are not to be allowed access, but also when such access is allowed to occur and which users are authorized. The access rules database may have an Allow portion, a Deny portion or both. Processing with respect to the Allow database is performed prior to processing with respect to the Deny database. Therefore, if there is an entry for the requested connection in the Allow database and no entry for that connection in the Deny database, then the connection will be allowed. If there is no Allow database and no entry in the Deny database, then the connection will also be allowed. If there is an entry for the requested connection in the Deny database, then the connection will be denied regardless. Machines may be specified by name or by IP address, and may include "wildcards," address masks, etc., for example: MisterPain-.com,*.srmc.com, 192.168.0.*, 192.168.0.0/24, and so on.

Time restrictions may be included in either the Allow rules or the Deny rules. For example, access may be allowed from 1am to 12 pm; alternatively, access may be denied from 12 pm to 1 am. Also, rules may be defined by identifiers, such as RULE1, RULE2, etc., and used elsewhere within the configuration sub-file of the virtual host to simplify and alleviate the need for replication.

All access rules must be satisfied in order to gain access to a virtual host. Depending on the virtual host, however, and as specified within the configuration sub-file, separate access scrutiny may be applied based on DNS entries. The accessing machine may be required to have a DNS (Domain Name Services) entry. Having a DNS entry lends at least some level of legitimacy to the accessing machine. Furthermore, the accessing machine may in addition be required to have a reverse DNS entry. Finally, it may be required that the forward DNS entry and the reverse DNS entry match each other, i.e., that an address mapped to from a given host name map back to the same host name.

If access is granted and a connection is opened, when the connection is later closed, a log entry is made recording information about that access. Log entries may also be made when a connection is opened, as data transport proceeds, etc.

Figure 8:
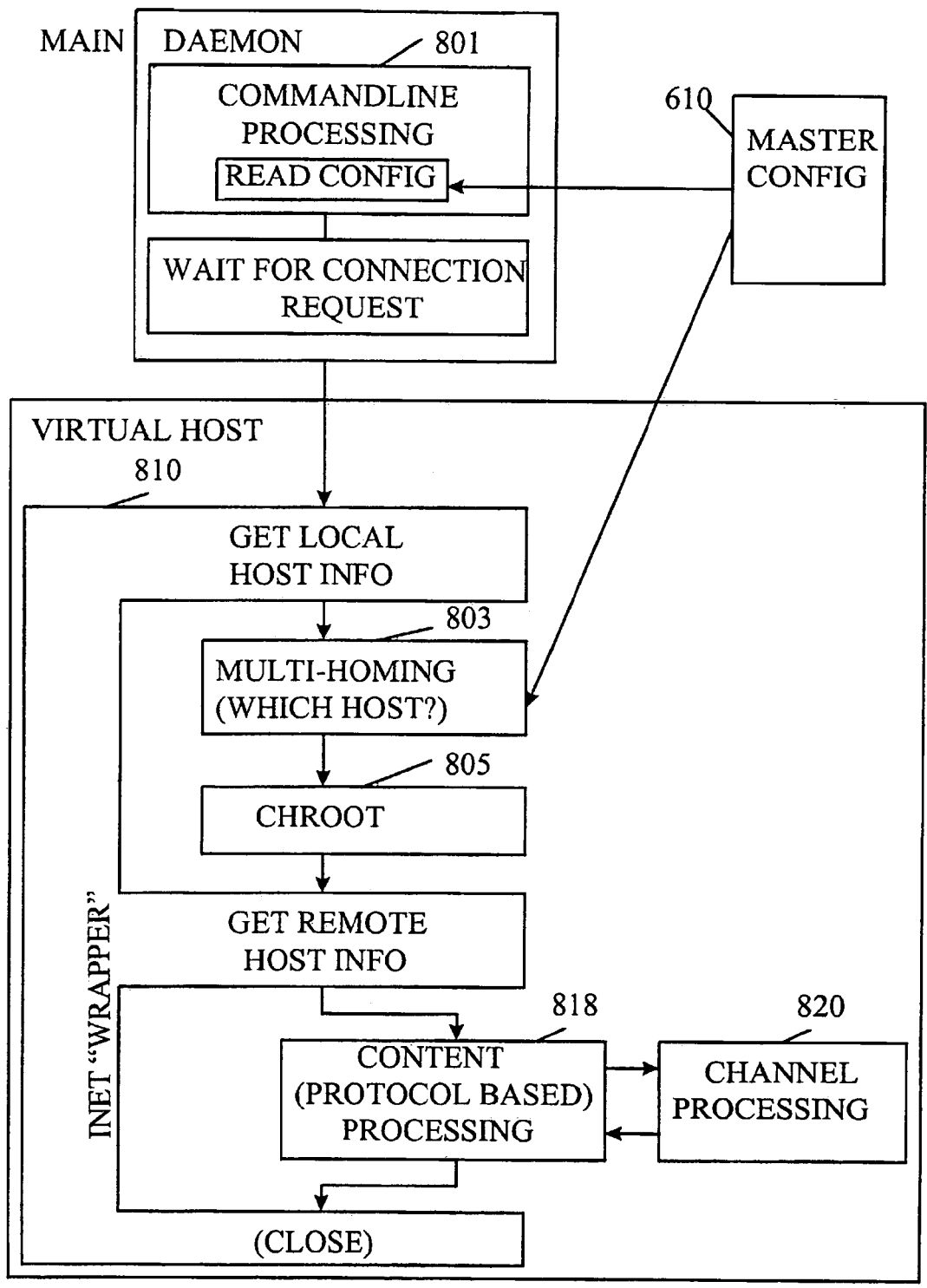
FIG. 8 is a block diagram illustrating in greater detail the structure of the present firewall.

Referring now to FIG. 8, the logical structure of the present firewall is shown in greater detail. The main execution of the firewall is controlled by a daemon. In FIG. 8, the daemon includes elements 801, 803 and 805. Although the daemon mode of operation is the default mode, the same code can also be run interactively under the conventional INETD daemon. Hence, when the firewall is first brought up, command-line processing is performed in block 801 to determine the mode of operation (daemon or interactive), which configuration file to read, etc. For purposes of the present discussion, the daemon mode of operation, which is the default, will be assumed.

In the daemon mode of operation, a process first reads the configuration file before becoming a daemon. By daemonizing after the configuration file (e.g., the master configuration file) has been read, the configuration file in effect becomes "hard coded" into the program such that the program no longer has to read it in. The daemon then waits to receive a connection request.

When a connection request is received, the daemon spawns a process to handle the connection request. This process then uses a piece of code referred to herein as an INET Wrapper 810 to check on the local side of the connection and the remote side of the connection to determine, in accordance with the appropriate Allow and Deny databases, whether the connection is to be allowed.

First the address and name (if possible) are obtained of the virtual host for which a connection is requested. Once the virtual host has been identified by name or at least by IP address, the master configuration database is scanned to see if a corresponding sub-database exists for that virtual host. If so, the sub-database is set as the configuration database of the virtual host so that the master configuration database need no longer be referred to. If no corresponding sub-database is found, then by default the master configuration database is used as the configuration database. There may be any number of virtual hosts, all independently configurable and all running on the same physical machine. The determination of which virtual host the process is to become is made in block 803, under the heading of "multi-homing."

Once the process has determined which host it is, immediately thereafter, the process changes to a user profile in block 805 as defined in the configuration, so as to become an unprivileged user. This step of becoming an unprivileged user is a security measure that avoids various known security hazards. The INET Wrapper is then used to check on the remote host, i.e., the host requesting the connection. First, the configuration database is consulted to determine the level of access scrutiny that will be applied. (The default level of access scrutiny is that no DNS entry is required.) Then, the address and name (if possible) are obtained of the machine requesting the connection, and the appropriate level of access scrutiny is applied as determined from the configuration database.

If the remote host satisfies the required level of access scrutiny insofar as DNS entries are concerned, the INET Wrapper gets the Allow and Deny databases for the virtual host. First the Allow database is checked, and if there is an Allow database but the remote host is not found in it, the connection is denied. Then the Deny database is checked. If the remote host is found in the Deny database, then the connection is denied regardless of the allow database. All other rules must also be satisfied, regarding time of access, etc. If all the rules are satisfied, then the connection is allowed.

Once the connection has been allowed, the virtual host process invokes code 818 that performs protocol-based connection processing and, optionally, code 823 that performs channel processing (encryption, decryption, compression, decompression, etc.). When processing is completed, the connection is closed, if it has not already been closed implicitly.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A virtual private network comprising:
    a first private network including a first firewall interposed between the first private network and a public network;
    a second private network including a second firewall interposed between the second private network and the public network;
    the first and second firewalls being configured to provide an encrypted path for traffic flowing between the first and second firewalls; and
    wherein a dedicated domain name server is associated with each of the first and second firewalls for establishing DNS mappings for the virtual private network.

2. The virtual private network of claim 1, where the dedicated domain name server comprises a virtual host on the same physical machine as either of the first or second firewalls.

3. The virtual private network of claim 2, wherein either of said first or second firewalls further comprises a plurality of virtual hosts, each of said virtual hosts corresponding to a home through which a connection may be made through either of said first or second firewalls.

4. The virtual private network of claim 3, wherein said domain name server responds with address information to the virtual host responding to a connection request.

5. The virtual private network of claim 1, wherein either of said first or second firewalls further comprise a configurator for providing a web-based front-end for configuring either of said first or second firewalls through a point-and-click interface using a web browser.

6. A virtual private network comprising:
    a first firewall means interposed between first private network and a public network means;
    a second firewall means interposed between a second private network and the public network;
    means for providing an encrypted path for traffic flowing between the first and second firewall means; and
    means for establishing DNS mappings for the virtual private network associated with each of the first and second firewalls means.

7. The virtual private network of claim 6, where the means for establishing DNS mappings comprises a virtual host means on the same physical machine as either of the first or second firewall means.

8. The virtual private network of claim 7, wherein either of said first or second firewall means further comprises a plurality of virtual hosts means for allowing a connection may be made through either of said first or second firewall means.

9. The virtual private network of claim 8, wherein said means for establishing DNS mappings responds with address information to the virtual host responding to a connection request.

10. The virtual private network of claim 6, wherein either of said first or second firewall means further comprise a configurator means for providing a web-based front-end for configuring either of said first or second firewall means through a point-and-click interface using a web browser.

11. A virtual private network comprising:
    a first firewall interposed between a first private network and a public network;
    a second firewall interposed between a second private network and the public network;
    an encrypted path for traffic flowing between the first and second firewalls; and
    a dedicated domain name server associated with each of the first and second firewalls for establishing DNS mappings for the virtual private network.

12. The virtual private network of claim 11, where the dedicated domain name server comprises a virtual host on the same physical machine as either of the first or second firewalls.

13. The virtual private network of claim 12, wherein either of said first or second firewalls further comprises a plurality of virtual hosts, each of said virtual hosts corresponding to a home through which a connection may be made through either of said first or second firewalls.

14. The virtual private network of claim 13, wherein said domain name server responds with address information to the virtual host responding to a connection request.

15. The virtual private network of claim 11, wherein either of said first or second firewalls further comprise a configurator for providing a web-based front-end for configuring either of said first or second firewalls through a point-and-click interface using a web browser.

* * * * *

UNITED STATES PATENT AND TRADEMARK OFFICE
CERTIFICATE OF CORRECTION

| | |
|---|---|
| PATENT NO. | : 7,249,378 B2 |
| APPLICATION NO. | : 10/700411 |
| DATED | : July 24, 2007 |
| INVENTOR(S) | : Wesinger, Jr. et al. |

It is certified that error appears in the above-identified patent and that said Letters Patent is hereby corrected as shown below:

Title Page
(63) Should Read --Continuation of application No. 10/210,326, filed on Aug. 1, 2002, now Pat. No. 6,751,738, which is a continuation of application No. 09/552,476, filed on Apr. 18, 2000, now Pat. No. 6,804,783, which is a continuation of application No. 09/299,941, filed on Apr. 26, 1999, now Pat. No. 6,052,788, which is a continuation of application No. 08/733,361, filed on Oct. 17, 1996, now Pat. No. 5,898,830.--

Signed and Sealed this

Thirteenth Day of January, 2009

JON W. DUDAS
*Director of the United States Patent and Trademark Office*

US007249378C1

(12) INTER PARTES REEXAMINATION CERTIFICATE (795th)

United States Patent
Wesigner et al.

(10) Number: US 7,249,378 C1
(45) Certificate Issued: *Jan. 13, 2014

(54) FIREWALL PROVIDING ENHANCED NETWORK SECURITY AND USER TRANSPARENCY

(75) Inventors: Ralph E. Wesigner, Naples, FL (US); Christopher D. Coley, Morgan Hill, CA (US)

(73) Assignee: Network Engineering Software Incorporated, San Jose, CA (US)

Reexamination Request:
No. 95/000,564, Aug. 6, 2010

Reexamination Certificate for:
Patent No.: 7,249,378
Issued: Jul. 24, 2007
Appl. No.: 10/700,411
Filed: Nov. 3, 2003

Certificate of Correction issued Jan. 13, 2009

( * ) Notice: This patent is subject to a terminal disclaimer.

Related U.S. Application Data

(63) Continuation of application No. 10/210,326, filed on Aug. 1, 2002, now Pat. No. 6,751,738, which is a continuation of application No. 09/552,476, filed on Apr. 18, 2000, now Pat. No. 6,804,783, which is a continuation of application No. 09/299,941, filed on Apr. 26, 1999, now Pat. No. 6,052,788, which is a continuation of application No. 08/733,361, filed on Oct. 17, 1996, now Pat. No. 5,898,830.

(51) Int. Cl.
*H04L 29/06* (2006.01)
*H04L 29/00* (2006.01)

(52) U.S. Cl.
USPC ................ 726/15; 726/11; 726/12; 726/14; 713/153; 713/154; 709/225; 709/227; 709/238; 707/E17.116; 370/351

(58) Field of Classification Search
USPC ............................................. 726/15
See application file for complete search history.

(56) References Cited

To view the complete listing of prior art documents cited during the proceeding for Reexamination Control Number 95/000,564, please refer to the USPTO's public Patent Application Information Retrieval (PAIR) system under the Display References tab.

*Primary Examiner* — Minh Dieu Nguyen

(57) ABSTRACT

The present invention provides a firewall that achieves maximum network security and maximum user convenience. The firewall employs "envoys" that exhibit the security robustness of prior-art proxies and the transparency and ease-of-use of prior-art packet filters, combining the best of both worlds. No traffic can pass through the firewall unless the firewall has established an envoy for that traffic. Both connection-oriented (e.g., TCP) and connectionless (e.g., UDP-based) services may be handled using envoys. Establishment of an envoy may be subjected to a myriad of tests to "qualify" the user, the requested communication, or both. Therefore, a high level of security may be achieved. The usual added burden of prior-art proxy systems is avoided in such a way as to achieve fall transparency—the user can use standard applications and need not even know of the existence of the firewall. To achieve full transparency, the firewall is configured as two or more sets of virtual hosts. The firewall is, therefore, "multi-homed," each home being independently configurable. One set of hosts responds to addresses on a first network interface of the firewall. Another set of hosts responds to addresses on a second network interface of the firewall. In one aspect, programmable transparency is achieved by establishing DNS mappings between remote hosts to be accessed through one of the network interfaces and respective virtual hosts on that interface. In another aspect, automatic transparency may be achieved using code for dynamically mapping remote hosts to virtual hosts in accordance with a technique referred to herein as dynamic DNS, or DDNS.

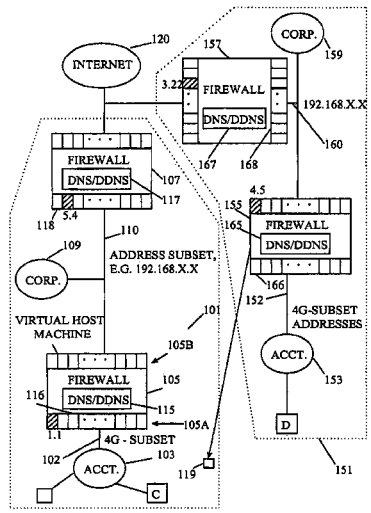

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-15 are cancelled.

\* \* \* \* \*